US008131699B2

(12) United States Patent
Satoh et al.

(10) Patent No.: US 8,131,699 B2
(45) Date of Patent: Mar. 6, 2012

(54) MENU DISTRIBUTION SYSTEM, MENU SERVER, READ/WRITE DEVICE, METHOD, AND COMPUTER READABLE RECORDING MEDIUM

(75) Inventors: Shinji Satoh, Kanagawa (JP); Takahito Uga, Kanagawa (JP); Takuma Katori, Tokyo (JP); Atsushi Nakafuji, Tokyo (JP); Hideharu Kamiyama, Kanagawa (JP); Keiichi Suzuki, Tokyo (JP); Yasushi Yamaguchi, Tottori (JP); Yukio Yonemura, Tottori (JP); Masayuki Hayano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 370 days.

(21) Appl. No.: 12/209,811

(22) Filed: Sep. 12, 2008

(65) Prior Publication Data

US 2009/0132492 A1 May 21, 2009

(30) Foreign Application Priority Data

Sep. 13, 2007 (JP) ................................ 2007-238540

(51) Int. Cl.
*G06F 17/30* (2006.01)

(52) U.S. Cl. ........... 707/705; 707/944; 705/15; 715/810

(58) Field of Classification Search ........................ None
See application file for complete search history.

(56) References Cited

U.S. PATENT DOCUMENTS

| | | | | |
|---|---|---|---|---|
| 6,914,582 | B2 * | 7/2005 | Tanaka | 345/1.1 |
| 2002/0062266 | A1 | 5/2002 | Aoki | |
| 2005/0094004 | A1 * | 5/2005 | Gotanda | 348/241 |
| 2007/0144835 | A1 * | 6/2007 | Zhang | 186/39 |
| 2007/0205278 | A1 * | 9/2007 | Lovett | 235/383 |

FOREIGN PATENT DOCUMENTS

JP 2002-157319 5/2002

* cited by examiner

*Primary Examiner* — Hung Q Pham
(74) *Attorney, Agent, or Firm* — Dickstein Shapiro LLP

(57) ABSTRACT

Disclosed is a menu distribution system that provides a menu, which is viewable in a conventional manner and is customized for each customer. A customer allows a read/write device to read a customer ID information storage medium storing customer ID information. The read/write device transmits the customer ID information to a menu server. The menu server has a customer information storage unit that stores, for each customer, attribute information such as food preferences. The menu server selects a menu item most suitable for the customer identified by the transmitted customer ID information, by comparing customer attribute information and menu items stored in a menu item information storage unit. Menu image data is generated based on the selected menu item and is transmitted to the read/write device. The read/write device writes the received menu image data to a memory of a paper like display.

4 Claims, 15 Drawing Sheets

FIG. 4A

MENU ITEM INFORMATION STORAGE UNIT 231

| MENU ITEM IDENTIFICATION INFORMATION | MENU ITEM NAME | PRICE | CALORIE | IMAGE INFOR-MATION | DETAILED INFOR-MATION | QUANTITY OF INVENTORY | MOR-NING MENU | LUNCH MENU | DINNER MENU | ... |
|---|---|---|---|---|---|---|---|---|---|---|
| 00001 | HAMBURGER STEAK | 780YEN | 550KCAL | aaaa.jpg | VERY JUICY!!! | 30 | 0 | 1 | 1 | ... |

FIG. 4B

FRAME INFORMATION TABLE 232

| TIME PERIOD | FRAME INFORMATION FILE |
|---|---|
| MORNING | FILE A |
| DAYTIME | FILE B |
| NIGHT | FILE C |

FIG. 4C

CUSTOMER INFORMATION STORAGE UNIT 233

| CUSTOMER ID INFORMATION | CUSTOMER NAME | AGE GROUP | SEX | PLACE OF ORIGIN | FAVORABLE FOOD MATERIAL | UNFAVOR-ABLE FOOD MATERIAL | ALLERGEN FOOD MATERIAL | ... |
|---|---|---|---|---|---|---|---|---|
| aaaaa | A YAMADA | 20's | FE-MALE | TOKYO | MEAT, STRAWBERRY | CARROT | OYSTER | ... |

FIG. 4D

ORDER HISTORY INFORMATION STORAGE UNIT 234

| MENU ITEM ID INFORMATION | CUSTOMER ID INFORMATION | ORDERING DATE | PAYMENT |
|---|---|---|---|
| 00001 | aaaaa | 2007/5/25 | o |

FIG. 6

EXAMPLE QUESTIONNAIRE

| | |
|---|---|
| NAME | |
| AGE GROUP | OUNDER 10 OTEENS OTWENTIES OTHIRTIES OFORTIES OFIFTIES OSISXTIES OSEVENTIES OOVER 80 |
| PLACE OF ORIGIN | |
| SEX | OMALE OFEMALE |
| FAVORABLE FOOD MATERIAL | |
| UNFAVORABLE FOOD MATERIAL | |
| PREFERENCE (MU LTIPLE SELECTION POSSIBLE) | OSWEETS OHOT OFRIED OBOILED OMAINLY VEGETABLES OMAINLY MEATS OMAINLY FISH |
| ALLERGIES | OBUCKWHEAT OWHEAT OPEANUT OEGG OFISH AND SHELLFISH OOTHERS |
| GIVE DETAILS WHEN "OTHERS" IS SELECTED | |
| VEGETARIAN? | OYES ONO |
| ON DIET? | OYES ONO |
| DIABETIC? | OYES ONO |
| ANY OTHER INFORMATION? | |

FIG. 11

| | CUSTOMER ATTRIBUTE | DESCRIPTION OF ATTRIBUTES | EXAMPLE OF WEIGHTING POINT |
|---|---|---|---|
| POSITIVE ATTRIBUTES | FAVORABLE FOOD MATERIALS | TYPE OF FOOD MATERIAL, SUCH AS MEAT OR VEGETABLE MAY BE DESIGNATED, OR FOOD MATERIAL ITSELF, SUCH AS PORK OR TOMATO, MAY BE DESIGNATED. | +3 |
| | PLACE OF ORIGIN | DESIGNATE PREFECTURE OR COUNTRY IF ABROAD. | +3 |
| | PREFERENCES | DESIGNATE "FRIED", "SWEETS", "HOT", ETC. IF "DIABETICS" OR "ON DIET" IS SELECTED IN QUESTIONNAIRE, "LOW CALORIES" WILL BE DESIGNATED. | +3 |
| | REQUESTS | DESIGNATE REQUESTS SUCH AS "WISHES TO BUILD MUSCLES". | +3 |
| NEGATIVE ATTRIBUTES | ALLERGEN FOOD MATERIAL | DESIGNATE FOOD MATERIAL | −5 |
| | UNFAVORABLE FOOD MATERIALS | DESIGNATE FOOD MATERIAL TYPE OR FOOD MATERIAL ITSELF. | −3 |
| | REFRAINED FOOD MATERIALS (EG. FOR RELIGIOUS REASONS) | DESIGNATE FOOD MATERIAL TYPE OR FOOD MATERIAL ITSELF. IF "VEGETARIAN" IS SELECTED IN QUESTIONNAIRE, "NON-VEGETABLES" WILL BE DESIGNATED. | −3 |

COMPARABLE ATTRIBUTE PAIR

| MENU ITEM ATTRIBUTE | DESCRIPTION OF ATTRIBUTE |
|---|---|
| FOOD MATERIALS CONTAINED IN MENU ITEM | DESIGNATE EVERY FOOD MATERIAL |
| AREA OF PRODUCTION OF FOOD MATERIAL | DESIGNATE PREFECTURE OR COUNTRY IF ABROAD FOR EACH FOOD MATERIAL |
| ORIGIN OF THE DISH | DESIGNATE PREFECTURE OR COUNTRY IF ABROAD |
| CATEGORY | DESIGNATE CLASSIFICATION TO WHICH MENU ITEM BELONGS (E.G., "BOWL STYLE", "FRIED", "SWEETS", ETC |
| KEYWORD | DESIGNATE INFORMATION REPRESENTING FEATURE OF MENU ITEM (E.G., "VOLUMEFUL", "LOW CALORIES", ETC.) PREPARE A LOT OF KEYWORDS MATCHING WITH CUSTOMER ATTRIBUTE ITEM "REQUEST" |
| PRICE | PRICE OF MENU ITEM |

MENU DISTRIBUTION SYSTEM, MENU SERVER, READ/WRITE DEVICE, METHOD, AND COMPUTER READABLE RECORDING MEDIUM

BACKGROUND OF THE INVENTION

1. Field of the Invention

The present invention relates to a menu distribution system, a menu server, a read/write device, a method for controlling the same, and a computer readable recording medium.

2. Description of the Related Art

A paper menu provided in a restaurant is replaced with another menu at a different time of the day, or is reprinted when new menu items are added. The use of paper menus puts a large burden on a store side.

A technique of storing attribute information of menu items in a server, downloading the menu item attribute information from the server onto a display located at each table and displaying a menu with the menu item attribute information on the display in order to relieve such a burden on a store is disclosed in, for example, Unexamined Japanese Patent Application KOKAI Publication No. 2002-157319. However, due to economical reasons, there is a case where only a single display can be provided for each table, making it difficult for everyone at the table to see the menu. Also, when an elderly or the like who is not familiar with the operation of an electronic device attempts to read the menu, it is likely that they will have difficulties in figuring out how to operate the display.

Further, in order to attract customers, a store desires to provide customized services intended for individual customers.

SUMMARY OF THE INVENTION

The present invention has been made in view of the foregoing situations, and it is an object of the invention to provide a menu distribution system or the like that relieves a store's burden and provides a menu which can be customized for each customer and can be handled in a similar manner to a conventional paper menu.

To achieve the object, a menu distribution system according to a first aspect of the invention comprises:

a menu server; and a read/write device connected to the menu server over a network, that writes information provided by the menu server to a paper like display having a memory property, the read/write device having:

a customer identification information reading unit that reads, from a storage medium, customer identification information specifying a customer; and a customer identification information transmitting unit that transmits the read customer identification information to the menu server, the menu server having:

a customer information storage unit that stores one or more attribute information for each customer;

a menu item information storage unit that stores one or more attribute information for each menu item;

a selecting unit that selects one or more menu items from the menu items stored in the menu item information storage unit based on the attribute information associated with the menu items stored therein and/or the attribute information of the customer identified by the customer identification information transmitted;

a menu image generating unit that acquires the attribute information of the selected menu item by referring to the menu item information storage unit and generates menu image data based on the acquired attribute information; and a menu image transmitting unit that transmits the generated menu image data to the read/write device, the read/write device further having:

is a menu image receiving unit that receives menu image data from the menu server; and a display writing unit that writes the received menu image data to the paper like display so that the menu will be displayed thereon.

According to a second aspect of the invention, there is provided a read/write device that is connected over a network to a menu server that comprises a menu item information storage unit storing one or more attribute information for each menu item and a customer information storage unit storing one or more customer attribute of each customer;

a customer identification information reading unit that reads, from a storage medium, customer identification information specifying a customer;

a customer identification information transmitting unit that transmits the read customer identification information to the menu server;

a menu image receiving unit that receives, from the menu server, menu image data generated based on the attribute information associated with the menu items stored in the menu item information storage unit and/or the attribute information of the customer identified by the customer identification information transmitted by the customer identification information transmitting unit; and a display writing unit that writes the received menu image data to the paper like display having a memory property to thereby display a menu.

In the read/write device, the display writing unit may control the display to erase display contents upon reception of an erase message from the menu server.

In the read/write device, the display writing unit may control the display to erase display contents when a predetermined time elapses.

According to a third aspect of the invention, there is provided a menu server connected to a read/write device via a network, the read/write device writing information provided by the menu server to a paper like display, the menu server comprising:

a customer information storage unit that stores one or more attribute information for each customer;

a menu item information storage unit that stores one or more attribute information for each menu item;

a selecting unit that selects one or more menu items from the menu items stored in the menu item information storage unit based on the attribute information associated with the menu items stored therein and/or the attribute information of the customer identified by the customer identification information transmitted from the read/write device;

a menu image generating unit that acquires the attribute information of the selected menu item by referring to the menu item information storage unit and generates menu image data based on the acquired attribute information; and a menu image transmitting unit that transmits the generated menu image data to the read/write device.

In the menu server, the selecting unit may acquire a correlation value between the customer attribute information of the customer associated with the customer identification information received from the read/write device and the menu item attribute information of each menu item stored in the menu item information storage unit, and may select one or more menu items based on the acquired correlation value.

In the menu server, the selecting unit may compare each customer attribute information of the customer associated with the customer identification information received from the read/write device with each comparable menu item attribute information, and acquire the correlation value by summing up points given to those customer attribute information which are determined to be analogous to the menu item attribute.

The menu server may further comprise:

an order history information storage unit that stores customer identification information specifying a customer who has ordered the menu item in association with menu item identification information specifying the ordered menu item for every order received in a past, wherein the selecting unit refers to the order history information storage unit to select one or more menu items that has been frequently ordered in the past by the customer specified by the customer identification information received from the read/write device.

The menu server may further comprise a time period specifying unit that specifies the current time period of the day, wherein the menu item information storage unit further stores a time period in which each menu item can be provided, in association with the each menu item stored, and the selecting unit further selects from the selected menu items, one or more menu items that can be provided in the current time period.

In the menu server, the read/write device may be provided with an erase message transmitting unit that transmits a message for instructing the paper like display to erase the contents being displayed.

In the menu server, the menu item attribute information stored in the menu item information storage unit is defined in plurality of languages, the customer attribute information further specifies a preferable language for displaying a menu, and the menu image generating unit acquires menu item attribute information corresponding to the preferable language specified by the customer attribute information for generating menu image data.

According to a fourth aspect of the invention, there is provided a method of controlling a read/write device that is connected via a network to a menu server comprising a menu item information storage unit storing one or more attribute information for each menu item and a customer information storage unit storing one or more customer attribute of each customer, the read/write device including a customer identification information reading unit, a customer identification information transmitting unit, a display writing unit and a menu image receiving unit, the method comprising:

a customer identification information reading step in which the customer identification information reading unit reads from a storage medium, customer identification information specifying a customer;

a customer identification information transmitting step in which the customer identification information transmitting unit transmits the read customer identification information to the menu server;

a menu image receiving step in which the menu image receiving unit receives from the menu server, menu image data generated based on the attribute information associated with the menu items stored in the menu item information storage unit and/or the attribute information of the customer identified by the customer identification information transmitted by the customer identification information transmitting unit; and a display writing step in which the writing unit writes the received menu image data to the paper like display having a memory property to thereby display a menu.

According to a fifth aspect of the invention, there is provided a method of controlling a menu server connected to a read/write device via a network, the read/write device writing information provided by the menu server to a paper like display, the menu server having a customer information storage unit that stores one or more attribute information for each customer, a menu item information storage unit that stores one or more attribute information for each menu item, a selecting unit, a menu image generating unit, and a menu image transmitting unit, the method comprising:

a selecting step in which the selecting unit selects one or more menu items from the menu items stored in the menu item information storage unit based on the attribute information associated with the menu items stored therein and/or the attribute information of the customer identified by the customer identification information transmitted from the read/write device;

a menu image generating step in which the menu image generating unit acquires the attribute information of the selected menu item by referring to the menu item information storage unit and generates menu image data based on the acquired attribute information; and a menu image transmitting step in which the menu image transmitting unit transmits the generated menu image data to the read/write device.

According to a sixth aspect of the invention, there is provided a computer readable recording medium storing a program that allows a computer that is connected over a network to a menu server having a menu item information storage unit storing one or more attribute information for each menu item and a customer information storage unit storing one or more attribute information for each customer, to function as a read/write device, said program allowing the computer to function as:

a customer identification information reading unit that reads, from a storage medium, customer identification information specifying a customer, a customer identification information transmitting unit that transmits the read customer identification information to the menu server;

a menu image receiving unit that receives, from the menu server, menu image data generated based on the attribute information associated with the menu items stored in the menu item information storage unit and/or the attribute information of the customer identified by the customer identification information transmitted by the customer identification information transmitting unit; and a display writing unit that writes the received menu image data to the paper like display having a memory property to thereby display a menu.

According to a seventh aspect of the invention, there is provided a computer readable recording medium storing a program that allows a computer that is connected over a network to a read/write unit which writes information provided by the computer to a paper like display, to function as a menu server, said program allowing the computer to function as:

a customer information storage unit that stores one or more attribute information for each customer;

a menu item information storage unit that stores one or more attribute information for each menu item;

a selecting unit that selects one or more menu items from the menu items stored in the menu item information storage unit based on the attribute information associated with the menu items stored therein and/or the attribute information of the customer identified by the customer identification information transmitted from the read/write device;

a menu image generating unit that acquires the attribute information of the selected menu item by referring to the menu item information storage unit and generates menu image data based on the acquired attribute information; and a menu image transmitting unit that transmits the generated menu image data to the read/write device.

The present invention can provide a menu distribution system or the like that ensures reading in a conventional manner while relieving a store's burden, and provides a menu which can be customized for each customer.

BRIEF DESCRIPTION OF THE DRAWINGS

These objects and other objects and advantages of the present invention will become more apparent upon reading of the following detailed description and the accompanying drawings in which:

FIG. 4A is a diagram showing an example of the data structure of a menu item information storage unit;

FIG. 4B is a diagram showing an example of the data structure of a frame information table;

FIG. 4C is a diagram showing an example of the data structure of a customer information storage unit;

FIG. 4D is a diagram showing an example of the data structure of an order history information storage unit;

FIG. 6 is a diagram showing an example of a customer questionnaire;

FIG. 11 is a diagram exemplifying the customer and the menu item attribute pair for obtaining correlation values.

DETAILED DESCRIPTION OF THE PREFERRED EMBODIMENT

An embodiment of the present invention will now be described with reference to the accompanying drawings.

Figure 1:
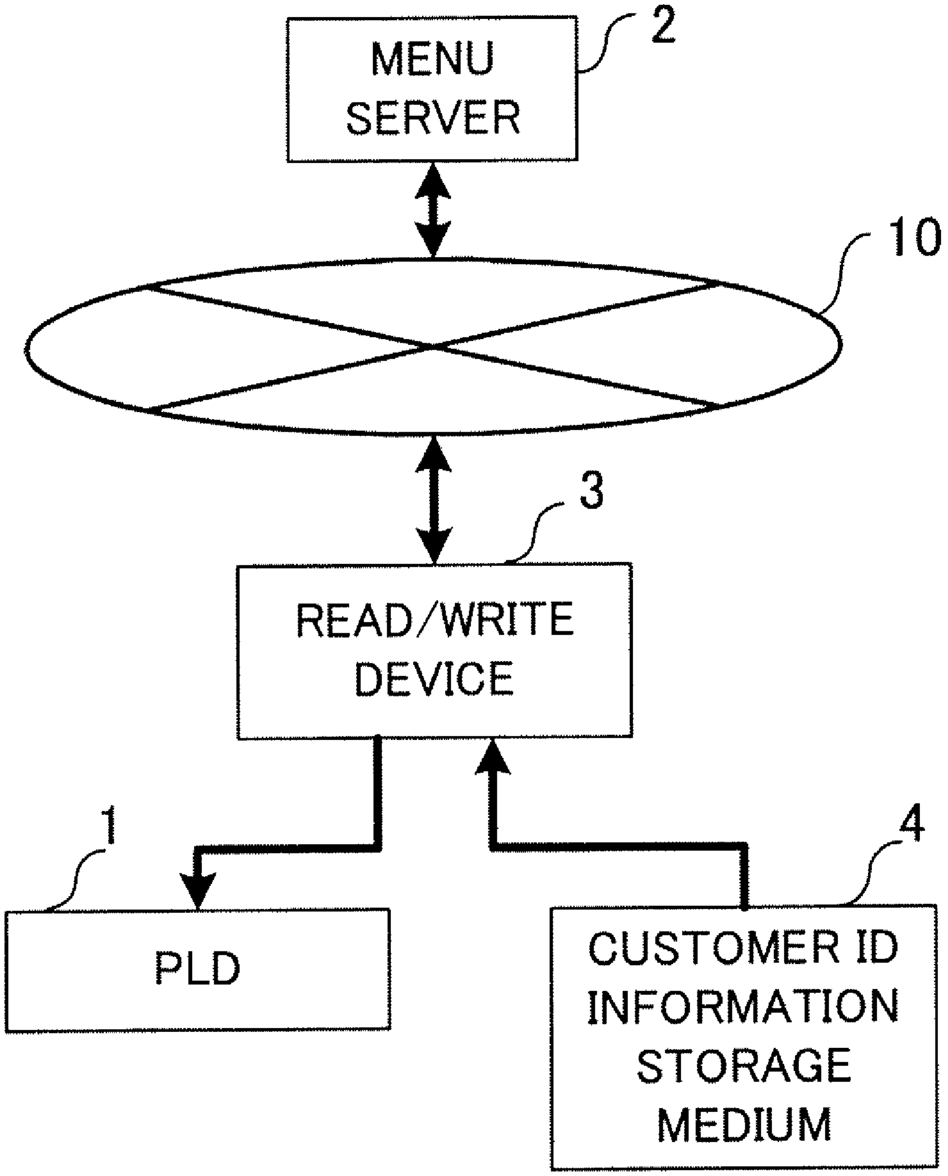
FIG. 1 is a block diagram exemplifying the configuration of a menu distribution system according to an embodiment of the present invention.

FIG. 1 is a block diagram exemplifying the configuration of a menu distribution system according to the embodiment. As shown in FIG. 1, the menu distribution system has a menu server 2 and a read/write device 3 connected together over a communication network 10. The read/write device 3 is connected with a PLD (Paper Like Display) 1 which is a display, and a customer identification (ID) information storage medium 4. For easier understanding, the following description will be given on the premise that each menu server 2 is placed in each store.

According to the embodiment, the menu server 2 transmits menu image data, having attribute information of menu items to be displayed on a menu, to the read/write device 3 over the communication network 10. The read/write device 3 writes menu image data to the PLD 1. As PLD stands for "Paper Like Display", the PLD 1 is a display which is thin and light and can be rolled like paper, and has a memory property so that display contents can be electrically rewritten. The use of the PLD 1 provides a menu that can be handled in a similar manner as a conventional paper menu, and that can instantaneously display the latest information transmitted from the menu server 2.

In the menu distribution system, customer ID information stored in the customer ID information storage medium 4 possessed by a customer, is read by the read/write device 3. The menu server 2 transmits different menu item attribute information for a different customer to the read/write device 3 according to the customer ID information transmitted from the read/write device 3. Accordingly, the PLD 1 is provided with a menu customized for each customer.

The following will describe the individual components of the menu distribution system shown in FIG. 1, which provide the foregoing functions.

First, as mentioned above, the PLD 1 is a display which is thin and light and can be rolled like paper, and has a memory property so that display contents can be electrically rewritten. While there are various types of displays for the PLD 1, such as an electrophoretic type and a liquid crystal type, any paper like display can be used as long as it has a memory property and does not need power to keep displaying the contents once rewritten.

The customer ID information storage medium 4 is a non-contact type IC card having an IC chip embedded in the embodiment. However, a cellular phone having an IC chip embedded therein, such as a wallet phone "OSAIFU KEITAI" (registered trademark), may be used instead of a card. Alternatively, a magnetic card or the like may be used. Any medium capable of storing information which can specify an individual can be used.

Figure 2:
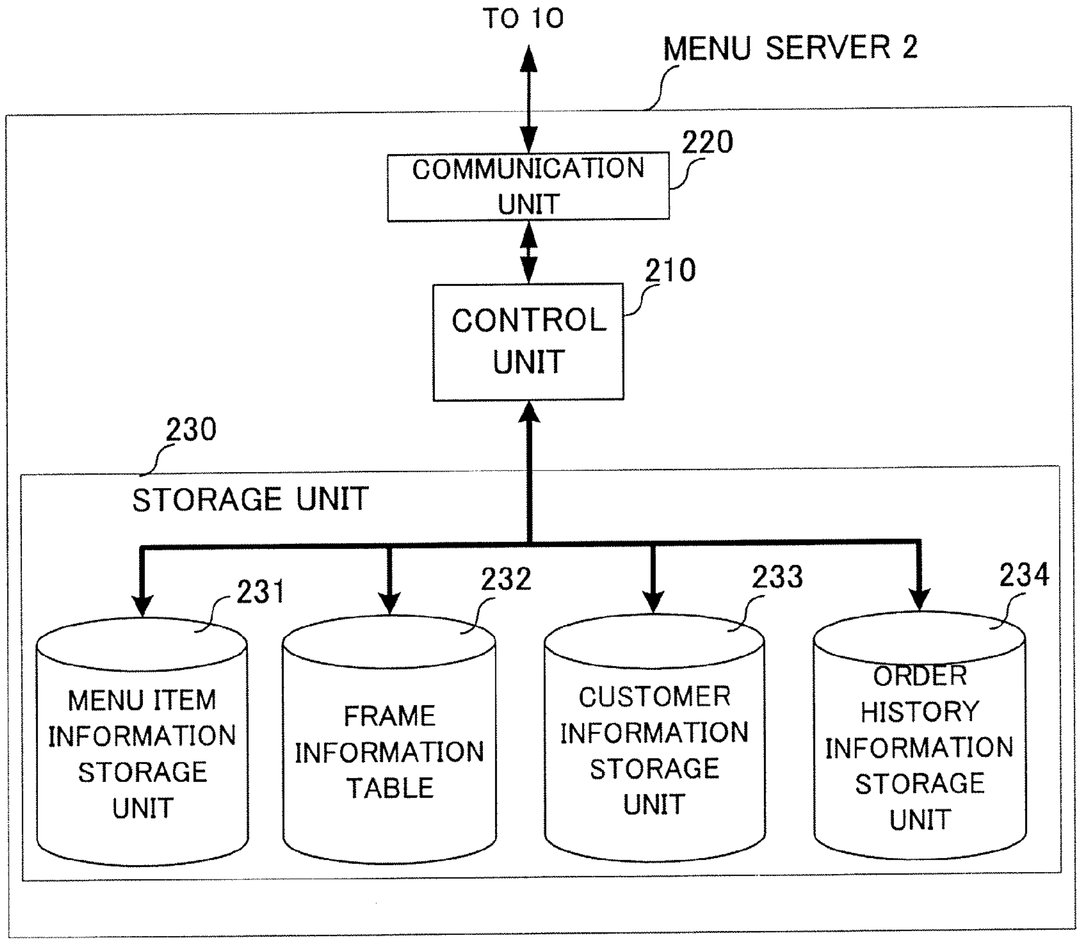
FIG. 2 is a block diagram exemplifying the configuration of a menu server.

Next, the menu server 2 will be described. The menu server 2 provides menu item attribute information to be written in the PLD 1. As shown in FIG. 2, the menu server 2 includes a control unit 210, a communication unit 220 and a storage unit 230. Those components will be described below.

The control unit 210 includes a CPU (Central Processing Unit) (not shown), ROM (Read Only Memory) (not shown), and RAM (Random Access Memory) (not shown), and performs the general control of the menu server 2. Specifically, as the CPU executes a program stored in the storage unit 230 to be described later, the control unit 210 executes control and operations. For example, the control unit 210 functions as a selecting unit for selecting menu item information to be transmitted to the read/write device 3 to be described later, and also functions as a menu image generating unit for generating menu image data. At the time of executing such control and operations, the CPU temporarily stores various data in the RAM and uses the RAM as a work area.

The communication unit 220 has a communication interface or the like, and functions as, for example, a menu image transmitting unit to transmit menu image data or the like to the read/write device 3 to be described later over the communication network 10. The communication unit 220 executes communication based on a protocol like TCP/IP. The communication unit 220 includes a modem unit, an infrared communication device or the like.

The storage unit 230 comprises a large-capacity hard disk device or so, and stores a control program including an operating system which performs the general control of the menu server 2. The storage unit 230 also stores a Web application program for customer information registration to be described later, or the like. The storage unit 230 functions as a menu item information storage unit 231, a frame information table 232, a customer information storage unit 233, an order history information storage unit 234 and so forth.

The menu item information storage unit 231 is a database to store information regarding menu items. FIG. 4A shows an example of the data structure of the menu item information storage unit 231. The menu item information storage unit 231 stores for each menu item, plurality of attribute information (hereinafter called menu item attribute information) including information to be displayed on a menu (hereinafter called menu display information). Such menu display information includes, name of the dish, price, image information, detailed information (information for introduction), and calories. Other attributes include quantity of inventory, a morning menu flag, a lunch menu flag, and a dinner menu flag. The "quantity of inventory" is information indicative of how many dishes remain available. The morning, lunch and dinner menu flags each indicate a period of a day to provide the respective menu item. For menu items that are to be listed in the morning menu, "1", for example, is set to the morning menu flag. Otherwise, "0" is set. Likewise, "1" is set to the lunch menu flag for menu items to be inserted on the lunch menu while "1" is set to the dinner menu flag for menu items to be inserted on the dinner menu. These attribute information of a menu item are stored in association with menu item ID information specifying the menu item.

More menu item attributes stored in the menu item information storage unit 231 (i.e. attributes used to acquire correlation values) will be discussed later in the section describing a display process.

The frame information table 232 stores frame information which determines the layout of menu items to be listed in a menu, as shown in FIG. 4B. The frame information table 232 stores, for example, a period of a day to be shown and frame information in association with each other. That is, frame information is assigned to each of time periods; morning, daytime and night. Frame information is defined by tags as those seen in a markup language like HTML or XML. A menu is generated by placing a predetermined content in a predetermined area designated by a predetermined tag. Changing frame information can change the sequential order and positions of menu items to be shown on a menu. In the embodiment, although frame information is defined by a tag, it may be defined in other ways as long as it specifies what content is to be placed at which position.

The customer information storage unit 233 is a database to store information regarding customers. FIG. 4C shows an example of the data structure of the customer information storage unit 233. With customer ID information being a key, for example, attribute information of a customer specified by the customer ID information (such as various kinds of information on diet of the customer (e.g., favorable food materials, unfavorable food materials, allergen food materials) as well as name, age group, sex, place of origin, etc.) is stored in the customer information storage unit 233. Information to be stored in the customer information storage unit 233 is collected from a customer beforehand through a questionnaire or the like as will be described later in the section describing customer information registration process.

The order history information storage unit 234 is a database to store information regarding the history of orders made by a customer. As shown in an example of the data structure in FIG. 4D, for each menu item ordered, the order history information storage unit 234 stores, in each record, menu item ID information specifying the menu item, customer ID information specifying the customer who has ordered the menu item, date information on the date when the order is made, and a payment flag indicating whether payment is made. For example, "1" is set to the payment flag when payment of the menu item specified by the menu item ID information in the record is made, while "0" is set when the payment is not yet made.

Next, the read/write device 3 will be described. The read/write device 3 writes information transmitted from the menu server 2 into the PLD 1, and reads customer ID information from the customer ID information storage medium 4 and transmits the information to the menu server 2.

Figure 3A:
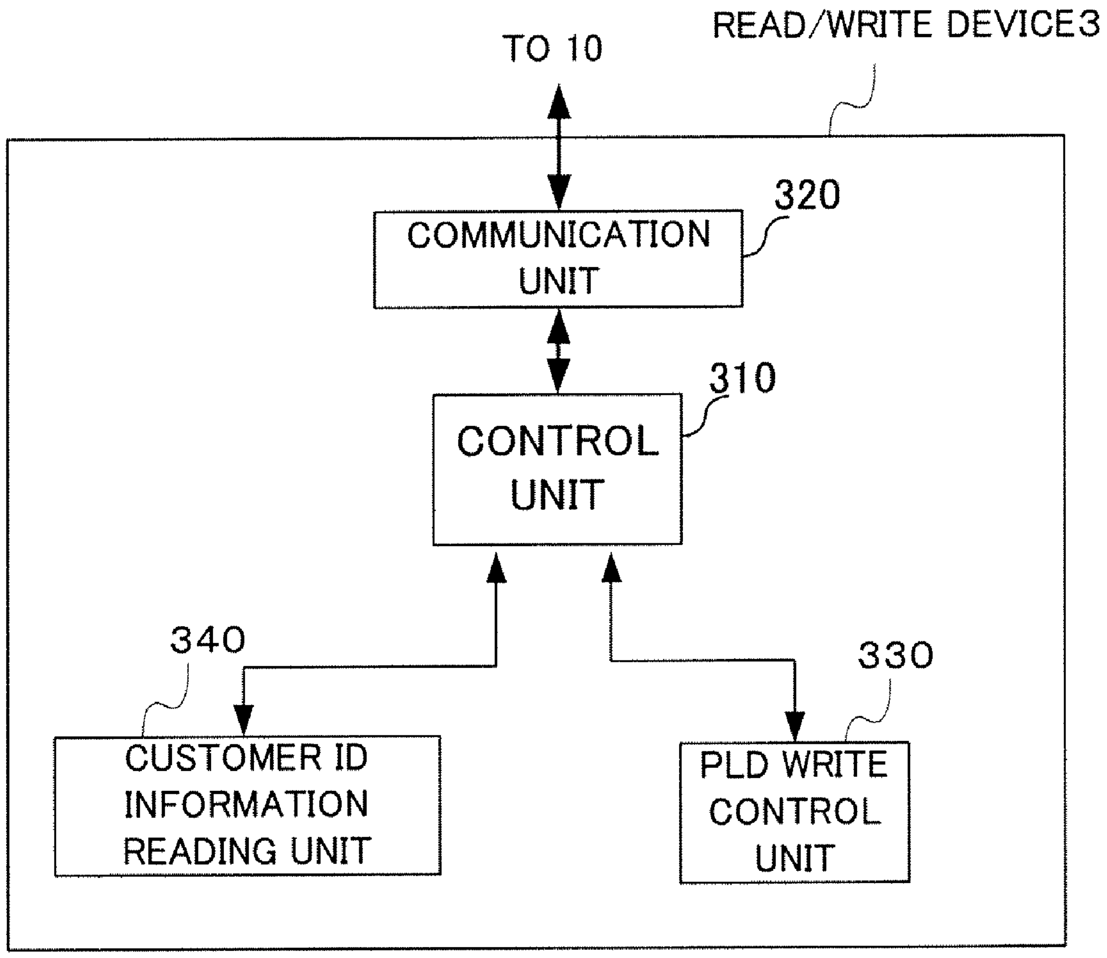
FIG. 3A is a block diagram exemplifying the configuration of a read/write device.

FIG. 3A shows the schematic configuration of the read/write device 3. As shown in FIG. 3A, the read/write device 3 includes a control unit 310, a communication unit 320, a PLD write control unit (display writing unit) 330, and a customer ID information reading unit 340. Those components will be described below.

The control unit 310 includes a CPU (Central Processing Unit) (not shown), ROM (Read Only Memory) (not shown), and RAM (Random Access Memory) (not shown), and performs the general control of the read/write device 3. Specifically, as the CPU executes a control program stored in the ROM, the control unit 310 executes various processes. For example, the control unit 310 executes control and operations, such as writing information transmitted from the menu server 2 into the PLD 1, and transmitting to the menu server 2, customer ID information, read from the customer ID information storage medium 4 by the customer ID information reading unit 340 to be described later. At the time of executing such control and operations, the CPU temporarily stores various data in the RAM to use the RAM as a work area.

The read/write device 3 may be provided with a storage unit to have a function in place of the ROM or RAM. The control program may be stored in the storage unit, not the ROM.

The communication unit 320 has a communication interface or the like, and functions as a customer ID information transmitting unit to transmit information like customer ID information to the menu server 2. The communication unit 320 also functions as a menu image receiving unit to receive generated menu image from the menu server 2. The communication unit 320 communicates based on a protocol like TCP/IP. The communication unit 320 includes a modem unit, an infrared communication device or the like.

The PLD write control unit 330 has a control circuit or the like, and writes menu item attribute information transmitted from the menu server 2 into the PLD 1.

The customer ID information reading unit 340 reads customer ID information for specifying a customer, which is stored in the customer ID information storage medium 4. In the embodiment, the customer ID information storage medium 4 is a non-contact type IC card having an IC chip embedded therein. However, the customer ID information storage medium 4 may be of any type as long as it can store customer ID information. When the customer ID information storage medium 4 is a magnetic card or a card having a barcode printed thereon, the customer ID information reading unit 340 can be a magnetic reader or an optical reader.

Figure 3B:
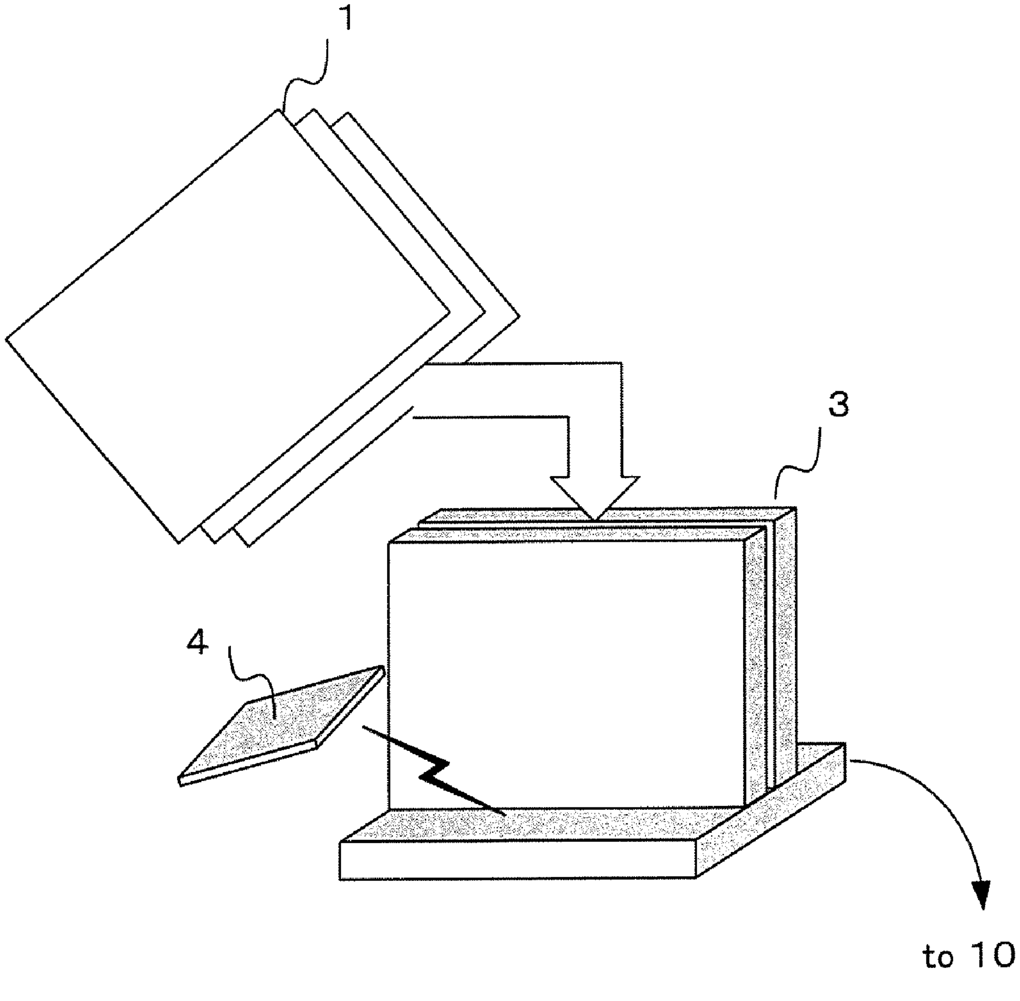
FIG. 3B is a diagram showing an example of the layout of the read/write device, a PLD and a customer ID information storage medium.

The read/write device 3 has the shape of a menu stand as shown in FIG. 3B, and the PLD write control unit 330 is placed in the space where the PLD 1 is set. A non-contact type reader for reading the customer ID information storage medium 4 is provided at one side of the read/write device 3.

Next, the operation of the menu distribution system will be described. The operation of the menu distribution system mainly includes registration of customer information, display of a menu, making an order for a menu item, and a payment process.

(Customer Information Registration Process)

Figure 5:
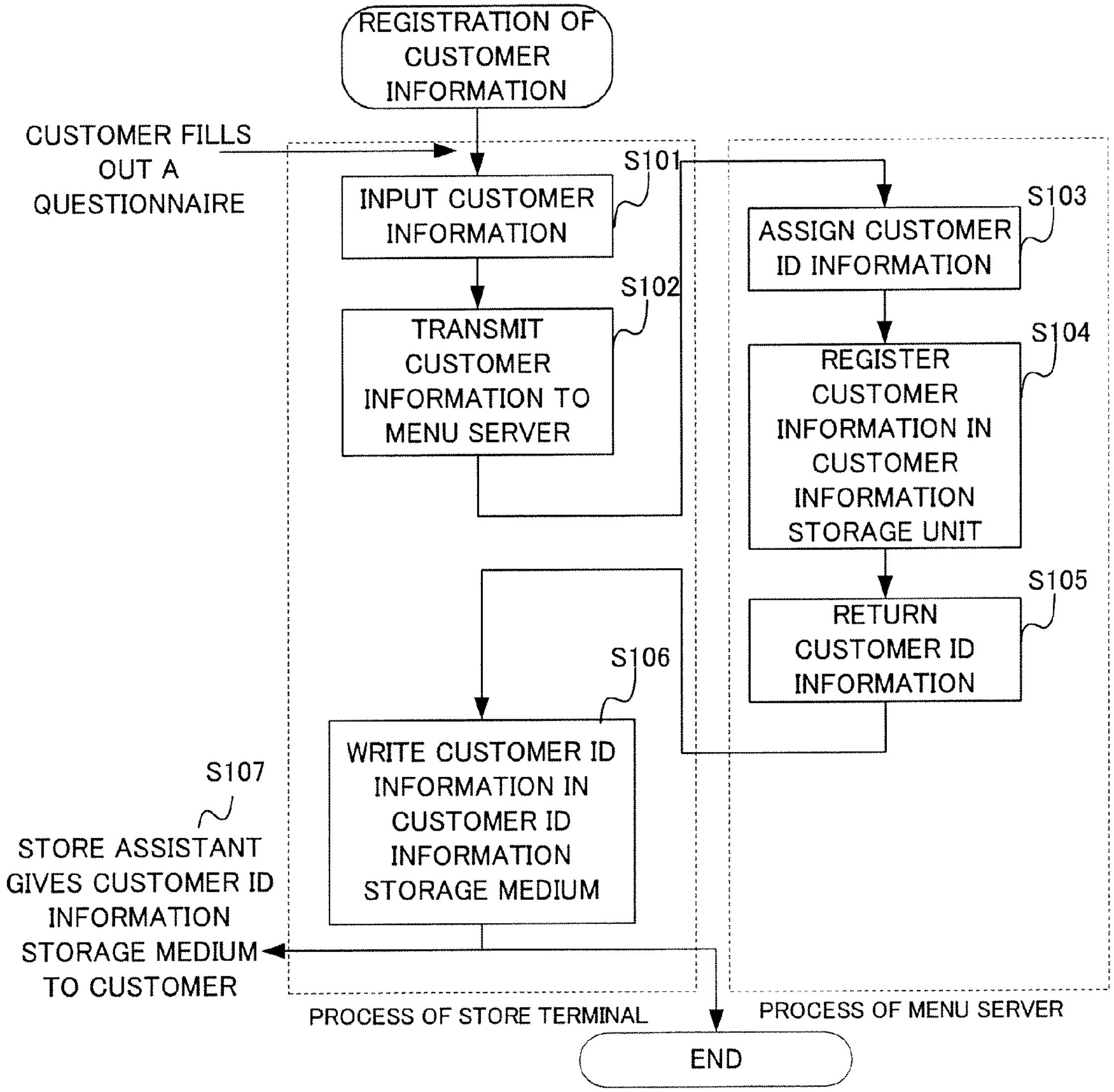
FIG. 5 is a flowchart illustrating an example of a customer information registration process.

FIG. 5 shows the flow of the process of registering customer information. First, when or before coming to a store, a customer fills out a questionnaire regarding customer attribute information (e.g., name, favorable food, unfavorable food, allergen food, age group, sex, place of origin, budget, intended calories to be collected, etc.). FIG. 6 shows an example of a questionnaire. A store assistant operates a personal computer terminal having a browser capability, placed in the store, to access a customer information registration Web site provided by the menu server 2 and input the result of the questionnaire (step S101).

After inputting the attribute information of the customer by operating the terminal, the store assistant depresses a button indicating transmission of the input information to the menu server 2 (step S102). When receiving the customer attribute information from the terminal, the control unit 210 of the menu server 2 generates customer ID information (step S103), and registers the customer attribute information in the customer information storage unit 233 in association with the customer ID information (step S104).

When the customer ID information is registered in the customer information storage unit 233, the menu server 2 returns customer ID information to the sender terminal of the customer attribute information (step S105). The terminal is connected with a writing unit for writing data in the customer ID information storage medium 4. The store assistant places a new customer ID information storage medium 4 having nothing stored therein onto the writing unit. The terminal transmits the customer ID information returned from the menu server 2 to the writing unit, which in turn writes the customer ID information into the customer ID information storage medium 4 (step S106). When the customer ID information is stored, the store assistant gives the customer ID information storage medium 4 to the customer (step S107).

The method of inputting customer attribute information is not limited to the foregoing approach. For example, a scanner may be connected to a personal computer terminal to read customer attribute information written on paper. Then, the terminal may transmit image data of the scanned information to the menu server 2 over the communication network 10. The menu server 2 has only to register the result of performing character recognition or the like on the received image data in the customer information storage unit 233. For answers to the questionnaire which are not selective type but need to be freely input, a word which is likely to be a keyword should be registered as a customer attribute in the customer information storage unit 233 using semantic analysis or syntax analysis.

Alternatively, a tablet type input device may be connected to the personal computer terminal placed in a store, with the questionnaire sheet being placed on the tablet. If an application program for character recognition is installed in the terminal, the result (customer attribute information) of performing character recognition on data input through the tablet can be transmitted to the menu server 2.

As another alternative approach, as mentioned above, the personal computer terminal may transmit data input through the tablet to the menu server 2 over the communication network 10. Then, an application program for character recognition may be installed in the menu server 2. The menu server 2 may perform character recognition or the like on received image data, and register the result in the customer information storage unit 233.

The questionnaire sheet placed on the tablet may be a PLD.

In addition, a customer may access a customer information registration Web site provided by the menu server 2 to input customer attribute information. At that time, for example, the menu server 2 generates temporary registration ID information besides customer ID information, and registers it in the customer information storage unit 233. The menu server 2 returns the temporary registration ID information to the terminal operated by the customer. The customer may print the temporary registration ID information, for example, and present the temporary registration ID information at a store. As a store assistant accesses the customer information registration Web site from the personal computer terminal, and inputs the temporary registration ID information, customer ID information stored in the customer information storage unit 233 in association with the temporary registration ID information is returned. Then, as mentioned above, the customer ID information is stored in the customer ID information storage medium 4 via the writing unit connected to the personal computer terminal.

As described above, customer attribute information should be registered in the customer information storage unit 233 by any method available. Then, customer ID information associated with the registered customer attribute information should be stored in the customer ID information storage medium 4.

(Menu Display Process)

Next, a menu display process will be described referring to FIG. 7. When a customer comes to a store and is guided to a table, the customer casts the customer ID information storage medium 4 over the read/write device 3 placed on each table enabling the customer ID information reading unit 340 to read off the customer ID information (step S201). The control unit 310 transmits the read information to the menu server 2 via the communication unit 320 (step S202).

Next, the control unit 210 of the menu server 2 acquires current time information, and determines, based on the current time, which one of the time periods, morning, daytime or night, it currently is (step S203). Time information is calculated based on a system clock (not shown) by the operating system or the like.

By referring to the menu item information storage unit 231, the control unit 210 acquires menu item ID information of a menu item whose current time period flag is valid and whose quantity of inventory is equal to or greater than 1 (step S204). Accordingly, menu items available during the current time period that are not yet sold out are specified.

The control unit 210 specifies a menu item recommended to the customer from those menu items which have been specified in step S204, based on the customer attribute information registered beforehand by the customer (who has been specified by the customer ID information transmitted in step S202) (step S205). For example, the control unit 210 refers to the customer information storage unit 233 to acquire customer attribute information stored in association with the received customer ID information. Then, the control unit 210 acquires a correlation value between the acquired customer attribute information and menu item attribute information (which can be acquired by referring to the menu item information storage unit 231) associated with the ID information of each menu item specified in step S204.

The control unit 210 acquires a correlation value between customer attribute information and menu item attribute information by executing, for example, the next process. As the premise of acquiring a correlation value, as shown in FIG. 11, those customer attributes registered in the customer information storage unit 233 which are used to acquire a correlation value are previously classified into a positive attribute and a negative attribute. Those customer attributes which belong to the positive attribute are given a positive weighting point, while those customer attributes which belong to the negative attribute are given a negative weighting point.

Meanwhile, each menu item in the menu item information storage unit 231 stores, in addition to the information shown in FIG. 4A, attribute information which are to be compared with customer attribute information. Attribute information to be compared includes, for example, at least one of "food materials contained", "area of production of food material", "origin of the dish", "category", "keyword", etc. In FIG. 11, a customer attribute and a menu item attribute pair comparable with each other are designated by connecting arrows. The control unit 210 compares each customer attribute with a menu item attribute comparable with the customer attribute to acquire a similarity therebetween (e.g., as shown in FIG. 11, the customer attribute "favorable food material" is compared with a menu item attribute "food materials contained").

Then, the control unit 210 acquires predetermined weighting points for all the customer attributes which are determined to be semantically identical to or very similar to menu item attribute information, and calculates the total of the points. The total is a correlation value between the customer attribute and menu item attribute.

For example, suppose that "fish" is registered in the customer attribute item "favorable food material" and "cod" is registered in the attribute information "food materials contained" of the menu item of current interest. In this case, since "fish" and "cod" are semantically similar and customer attribute "favorable food material" is given a weighting point of +3, a weighting point of +3 is added to the correlation value. Determining whether two pieces of information are semantically similar can be done by any method. For example, a table storing similar information may be prepared and two pieces of information to be compared are considered similar if those pieces of information are stored in a record in the table in association with each other. In this case, for example, "fish" and "cod" are stored in association with each other in the table having similar information therein.

Likewise, when a food material to be registered in the customer attribute "unfavorable food material", "allergen food material" or "refrained food material" is identical to or similar to information registered in the attribute, "food materials contained", of a menu item A, the negative weighting point given to each customer attribute is added to the correlation value of the menu item A (i.e., the point is subtracted from the total correlation value).

In the above manner, the control unit 210 acquires the correlation value between the attribute information of a customer and the attribute information of every menu item selected in step S204, and selects a predetermined number of menu items with highest correlation values, since menu items providing high correlation values fulfill the customer's demands. The "predetermined number" may be determined like, for example, "up to three upper-scoring menu items" or "up to ten upper-scoring menu items".

The customer attribute belonging to the positive attribute (e.g., "favorable food material" attribute), indicates a preferable attribute for a customer. On the other hand, the negative attributes like "unfavorable food material", and "allergen food material" is a customer attribute which is not considered favorable for a customer.

The weighting point can be adjusted according to the degree of importance of the customer attribute item. For example, eating an "allergen food material" may result in serious health problems. Therefore, customer attribute "allergen food material" may be given larger weighting points than those of other customer attributes.

The correlation value of a menu item may also be added when a designated condition is fulfilled. Suppose that the customer attribute includes "desired budget" and an amount therefor is designated. When a menu item is priced the same or lower than the amount designated by the "desired budget", a predetermined weighting point may be added to the correlation value of the menu item. Likewise, when "low calories" is designated in the customer attribute "preference" and a menu item has calories equal to or less than a predetermined value, a predetermined weighting point may be added to the correlation value of the menu item.

Customer attributes and menu item attributes to be used to acquire correlation values including the examples given above are shown in FIG. 11. Attribute items other than those shown in FIG. 11 may be introduced, as well.

Next, the control unit 210 specifies a recommended menu item according to the history of orders made by the customer from recommended menu items providable in the current time period specified in step S204 (step S206). That is, the control unit 210 refers to the order history information storage unit 234 to acquire order history information (comprising ordered menu item ID information, ordering date, etc.) associated with the received customer ID information. Then, of those menu items ordered by the customer in the past, menu items which have been specified in step S204 and which have frequently been ordered (e.g., up to three upper-ranked menu items) are specified. Alternatively, a menu item in the same category as the upper-ranked menu items may be specified. For example, when information "bowl style" is registered in the menu item attribute "category" for a upper-ranking menu item, another menu item whose "category" attribute is also "bowl style" may be specified.

If it is the first visit of a customer to a store and there is no history information on the customer, the control unit 210 should acquire ID information of a predetermined recommended menu item stored in the storage unit 230.

Next, the control unit 210 acquires a menu item recommended by the store from recommended menu items providable in the current time period specified in step S204 (step S207). The menu server 2 has a table storing menu item ID information of the recommended menu items in the storage unit 230. That is, the menu item specified by the menu item ID information registered in this table is what the store is eager to sell among the menu items registered in the menu item information storage unit 231. The control unit 210 acquires menu item ID information which is registered in the table and which belongs to the menu item specified in step S204.

Next, the control unit 210 acquires a greeting message to be displayed from the storage unit 230 according to the time period to which the current time belongs (greeting messages are stored beforehand in the storage unit 230 for the time period of morning, daytime and night, respectively) (step S208).

Then, the control unit 210 refers to the frame information table 232 to acquire frame information associated with the current time period (step S209). Next, the control unit 210 refers to the menu item information storage unit 231 to acquire menu item attribute information associated with the menu item ID information acquired through steps S204, S205, S206 and S207, and then inserts the customer name, the greeting message and the menu item attribute information in the frame information at predetermined tag positions (step S210). Accordingly, information synthesized as a menu (hereinafter called "menu information") is generated.

The control unit 210 transforms the menu information synthesized in step S210 to bit map information (menu image data), and transmits the menu image data to the read/write device 3 over the communication network 10 (step S211).

The control unit 310 of the read/write device 3 controls the PLD write control unit 330 to write the received image data in the PLD 1 (step S212). As a result, a menu is displayed on the PLD 1 (at which time, the PLD 1 needs to be placed in the menu stand part of the read/write device 3). Alternatively, an application program capable of transforming menu information to a bit map image may be stored in the ROM of the control unit 310, and in step S211, the control unit 210 may transmit menu information to the read/write device 3 without applying bit map transformation. In this case, the control unit 310 transforms the received menu information to bit map information using the application program. Then, the control unit 310 may control the PLD write control unit 330 to display the bit map information on the PLD 1.

Figure 10:
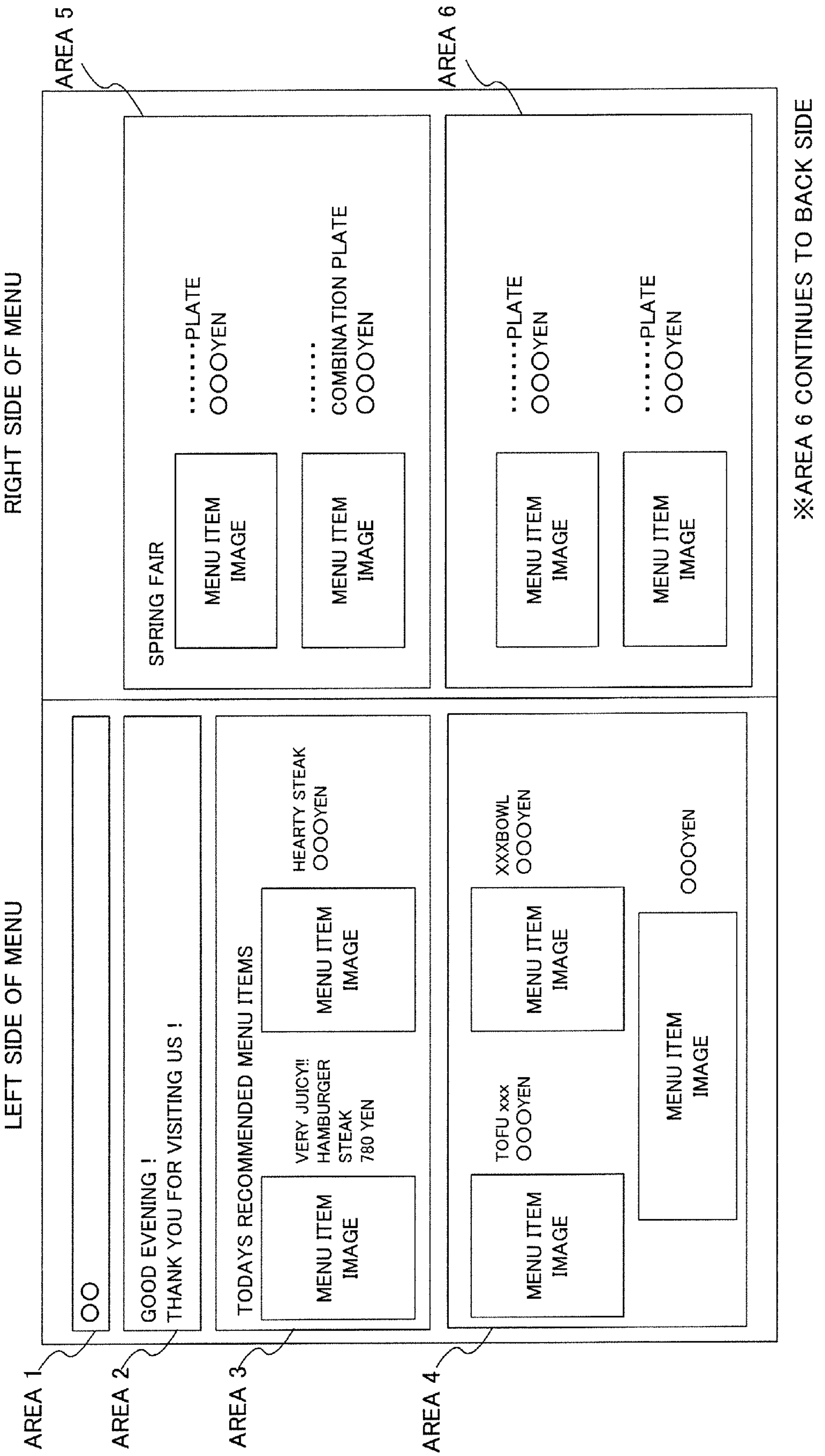
FIG. 10 is a diagram exemplifying the display contents of a menu.

A display example of the menu is shown in FIG. 10. A background designating the frame information (acquired in step S209) selected based on the time information is displayed at the background. Name information of the customer in the customer attribute information acquired in step S205 etc. is displayed in area 1. The greeting message acquired in step S208 is displayed in area 2. The menu item attribute information of the recommended menu item based on the past visiting history acquired in step S206 is displayed in area 3. The menu item attribute information of the recommended menu item based on the customer attribute information acquired in step S205 is displayed in area 4. Information on the menu item which is specified in step S207 and which the store is eager to sell is displayed in area 5. That is, information on a menu item specified according to the customer and information on a menu item recommended by the store are displayed at noticeable positions following areas 1 and 2. Finally, menu item attribute information of every menu item specified at step S204 to be providable in the current time period is displayed in area 6.

As mentioned above, the sequential order of displaying menu items and the display positions thereof can be changed by changing frame information stored in the frame information table 232. A menu need not be separated into six areas when displayed, so long as information on a menu item which is considered interesting to the customer is displayed at a noticeable portion, such as the top of the menu. For example, correlation values between customer attribute information and all menu items may be acquired, and attribute information of all menu items may be displayed in the descending order of the correlation values.

Figure 7:
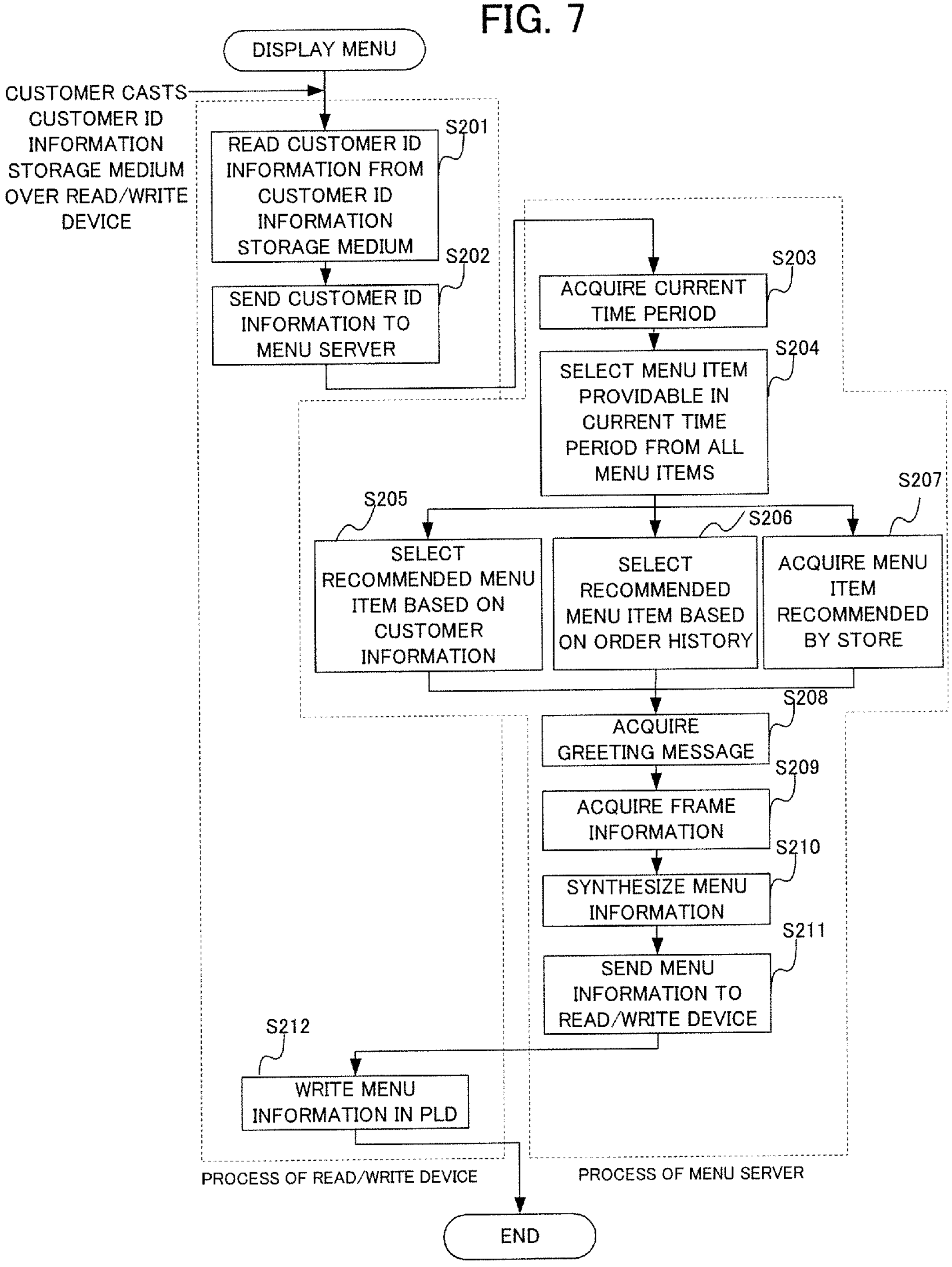
FIG. 7 is a flowchart illustrating an example of a menu display process.

Although steps S205 to S207 are carried out in parallel in FIG. 7, those steps may be carried out sequentially in any order.

(Ordering Process)

Figure 8:
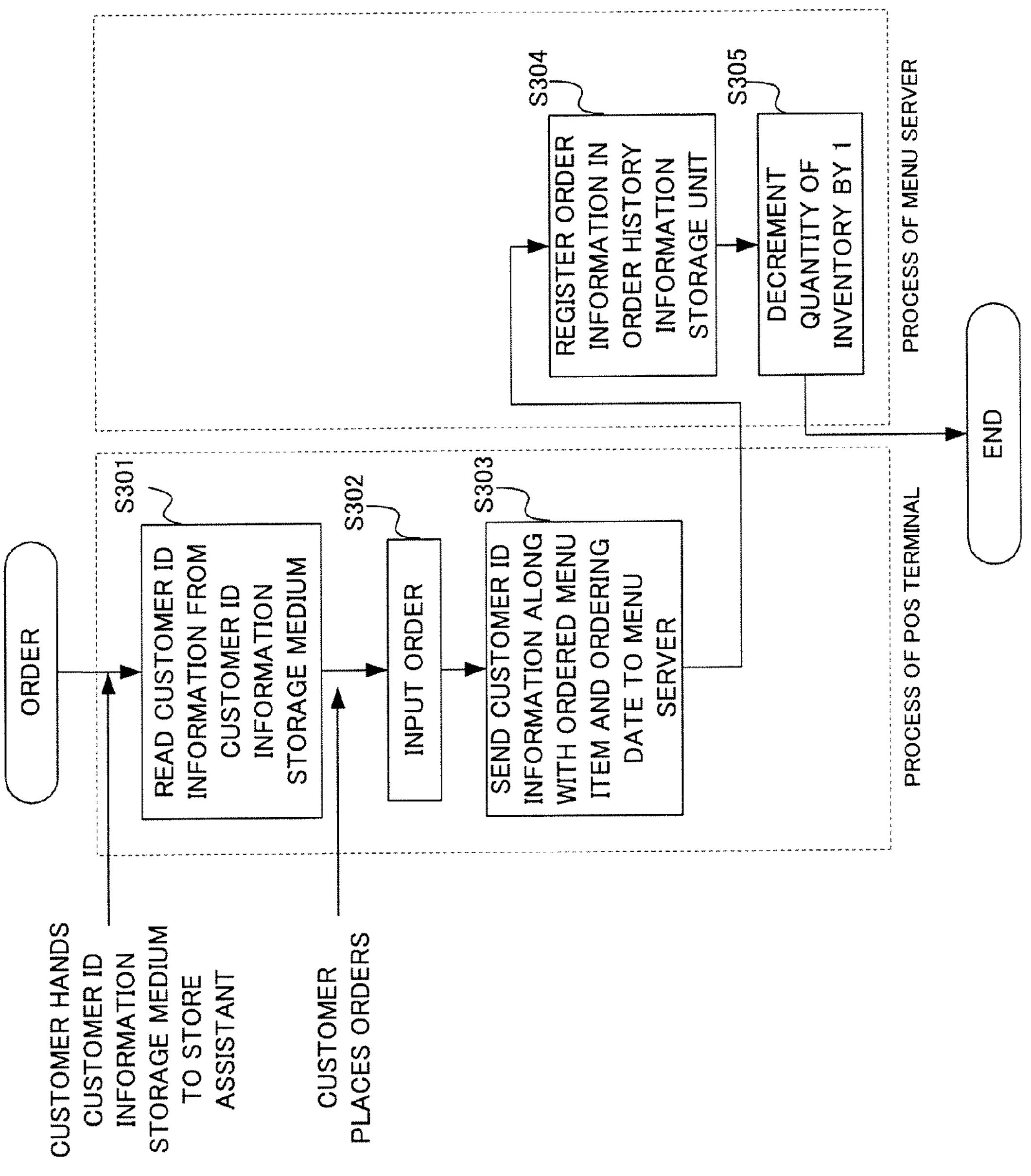
FIG. 8 is a flowchart illustrating an example of an ordering process.

The ordering process will now be described referring to FIG. 8. An order is input by a store assistant operating a POS terminal (not shown). The POS terminal radio-communicates with a wireless LAN access point (not shown) connected to the communication network 10 to exchange information with the menu server 2 connected to the communication network 10.

At the time of receiving an order, the store assistant receives the customer ID information storage medium 4 from a customer. The POS terminal has a customer ID information reading unit similar to the customer ID information reading unit 340 of the read/write device 3. The store assistant casts the customer ID information storage medium 4 over the customer ID information reading unit to read customer ID information stored in the customer ID information storage medium 4 (step S301). After the customer ID information is read, the store assistant inputs the order made by the customer into the POS terminal (step S302). When the store assistant presses an order acceptance button, the POS terminal transmits order information having menu item ID information of each menu item ordered, customer ID information and the order date to the menu server 2 (step S303).

The process of reading the customer ID information storage medium 4 in the POS terminal may be carried out before or after the order is received. The ID information of the ordered menu item and the ID information of the customer who has made the order should be transmitted to the menu server 2 in association with each other.

Upon reception of the order information, the control unit 210 of the menu server 2 stores the order information as one record (i.e., the ID information of the ordered menu item, the ID information of the ordering customer and the order date information which form the order information are associated with one another) in the order history information storage unit 234 (step S304). At this time, "0" (which indicates payment not yet been made) is set to the corresponding payment flag. Then, the control unit 210 decrements by 1, the number of inventory registered in the menu item information storage unit 231 in association with the received menu item ID information (step S305).

(Payment Process)

Next, the payment process of ordered menu items will be described referring to FIG. 9. The customer with the customer ID information storage medium 4 in a hand goes to a register terminal (not shown). The register terminal has a communication capability, and is connected to the menu server 2 over the communication network 10. The register terminal also has a customer ID information reading unit similar to the customer ID information reading unit 340 of the read/write device 3. The store assistant receives the customer ID information storage medium 4 from the customer, and causes the customer ID information reading unit of the register terminal to read the customer ID information stored in the customer ID information storage medium 4 (step S401). Then, the register terminal transmits the customer ID information to the menu server 2 (step S402).

The control unit 210 of the menu server 2 refers to the order history information storage unit 234 to acquire unpaid menu items ordered by the customer who is specified by the received customer ID information (step S403). That is, the control unit 210 searches for one or more records in the order history information storage unit 234, having the customer ID information of the received customer ID information, the order date of today, and the payment flag of "0", and acquires the menu item ID for the record found.

Next, the control unit 210 refers to the menu item information storage unit 231 to acquire a record having the menu item ID information acquired in step S403. The name and price of each menu item in the acquired record are returned to the register terminal that has transmitted the customer ID information (step S404). The register terminal sums the received prices and presents the result to the customer (step S405).

When the customer pays the displayed amount, and the store assistant inputs data indicating the payment has been made into the register terminal (step S406), the register terminal transmits a payment complete message to the menu server 2 (step S407). Upon reception of the payment complete message, the menu server 2 sets "1" (indicating that the payment has been made) to the payment flag stored in the order history information storage unit 234 in association with the menu item ID information acquired in step S403 (step S408), and then terminates the payment process.

(Menu Erasing Process)

When a predetermined period of time (e.g., 30 seconds) elapses after the PLD 1 is set in the read/write device 3, the PLD write control unit 330 erases the contents displayed on the PLD 1.

Figure 9:
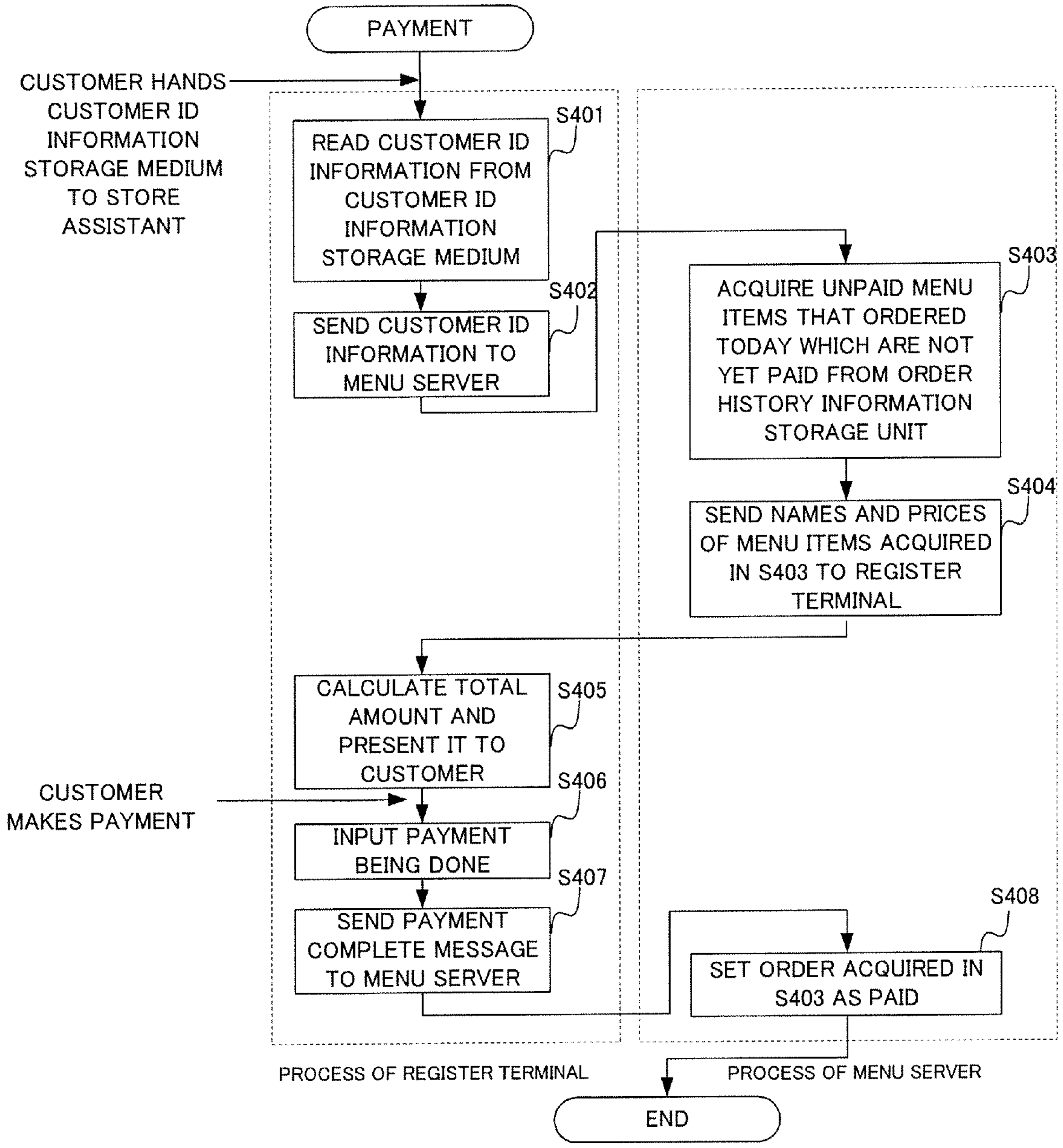
FIG. 9 is a flowchart illustrating an example of a payment process.

Alternatively, after step S408 of the payment process shown in FIG. 9, a message indicating that the display contents of the PLD 1 should be erased may be transmitted to the read/write device 3 which has transmitted, in step S202 of the display process, the same customer ID information as the ID information of the customer currently subjected to the payment process (the menu server 2 should store, like in association with each other, the ID information of the read/write device 3 which has carried out the transmission in step S202 and the transmitted customer ID information in the RAM or the, and the ID information of the read/write device 3 should be transmitted in step S202). Then, the read/write device 3 that has received the erase message may erase the display contents of the PLD 1 by controlling the PLD write control unit 330.

As apparent from the foregoing description of the embodiment of the present invention, the menu distribution system can register customer ID information in the menu server 2 beforehand, select menu item ID information according to the preference of a customer from what is registered in the menu item information storage unit 231, and display the menu item ID information at the top or noticeable positions of a menu. As the past order history of a customer are stored, it is possible to select the menu items the customer frequently orders, based on the order history, and to display the menu items on the menu to present them to the customer.

In addition, menu item attribute information to be shown on a menu is distributed according to current time period, thus relieving the burden of a store assistant from physically replacing menus. Further, menu item attribute information registered in the menu server 2 can be instantaneously transmitted to the PLD 1. When some menu items are sold out or when the area of productions of materials are suddenly changed, such events are reflected on a menu instantaneously. Thus a store assistant need not explain to the customer, every time such a situation occurs. Even when a menu is regularly changed, it is unnecessary to replace menus, leading to cost reduction.

There are several advantages of using the PLD 1 as a menu display device. For example, the PLD 1 is less bulky than an ordinary display device like an LCD monitor, which enables menus (PLDs) for the number of customers to be placed on a table. In addition, even those who are unfamiliar with the operation of an electronic device, such as the elderly, can easily browse through a menu in a similar fashion to a conventional paper menu. Further, the PLD 1 to be used in the embodiment needs application of a voltage only at the time of rewriting display contents, and not for sustaining the contents. Because the PLD 1 need not be constantly connected to the power source, the PLD 1 is suitable for displaying a menu.

The present invention is not limited to the foregoing embodiment, and can be modified and applied in various forms in working out the invention.

For example, the foregoing description of the embodiment has been given of the case where each customer has the customer ID information storage medium 4. The contents of the questionnaire shown in FIG. 6 are targeted for an individual. However, a family may have a single customer ID information storage medium 4. In this case, the contents of the questionnaire should be targeted for the family, and customer ID information should be assigned to the family. Then, fields for storing the age groups, tastes, etc. of all members of the family are provided in the customer information storage unit 233, and the answers to the questionnaire are registered in association with the customer ID information.

Various menu customizing methods other than that of the embodiment are construed. For example, menu items ordered for each age group and each sex may be collected from all the past order histories of all customers, and top menu items popular for each age group or each sex may be presented as recommended menu items. That is, order information stored in the order history information storage unit 234 may be regularly collected to prepare a table storing menu item attribute information of popular menu items for each age group and each sex in the storage unit 230 of the menu server 2. The control unit 210 refers to the customer information storage unit 233 to acquire the age group and sex of a customer. Then, ID information of menu items supported by the age group and sex to which the customer belongs has only to be acquired from the table.

When displaying menu items with attributes matching the customer attributes having negative points (e.g., menu items having an attribute: "food materials contained" that matches a customer attribute: "allergen food material "menu item"), a warning message may be shown on the menu.

In case of specifying recommended menu items based on customer attribute information, menu items which provide the maximum correlation value may not be specified, but menu items which fulfill the condition designated by the customer may be treated as recommended menu items. For example, all menu items which fulfill the condition that food materials registered in the customer attribute "allergen food material" are not contained as ingredients may be recommended.

It is to be noted that menu items which may interest a customer or menu items in which a store wants a customer to be interested should be displayed in a noticeable manner.

A menu display language may be designated in the questionnaire and the display language may be registered as customer attribute information. When the display language is designated, the menu is displayed in the designated language. In this case, language dependent contents (e.g., name, detailed information, etc.) in items in the menu item information storage unit 231 to be displayed on a menu are prepared in multiple languages. At the time of synthesizing menu information, contents written in the designated language should be selected.

Although customer ID information storage medium 4 is used to identify the customer in the embodiment) biological information such as fingerprints may be used instead. In this case, it is necessary to provide the customer ID information reading unit 340 with a device for reading biological information, and to install an application program capable of executing biometrics authentication in the read/write device 3 or the menu server 2. If a table storing biological information of a customer and customer ID information registered in the customer information storage unit 233 in association with each other is prepared, it is possible to acquire customer ID information from the biological information and provide the functions explained in the foregoing description of the embodiment.

The shape of the read/write device 3 is not limited to the one shown in FIG. 3B, and the PLD write control unit 330 has only to be disposed at the position where the PLD 1 is set. The entire table may be configured as the read/write device 3 and the non-contact type PLD write control unit 330 may be embedded in the table. This permits the PLD 1 to be replaced merely by placing a desired PLD on the table.

While the read/write device 3 is configured to have the customer information reading unit, a customer information reading device with a customer information reading function may be connected to the communication network 10 to become independent of the read/write device 3.

The embodiment has been described of the case where each menu server 2 is placed in each store. The embodiment, however, may be configured so that a single menu server 2 displays menus for a plurality of stores, such as chain stores. In this case, information unique to each store should be managed in that store. Therefore, menu item attribute information unique to a store is set independent of the menu item information storage unit 231. For example, individual stores may handle different menu items. In this case, a store-oriented menu item table, which stores, for each menu ID information, a store ID information that specifies a store providing the menu item identified by the menu ID information, is prepared. The inventory of menu items in each store is managed by the table. At the time of displaying a menu, the read/write device 3 has only to transmit store ID information to the menu server 2 in addition to customer ID information in step S202 in FIG. 7. The menu server 2 should execute processes of steps S204 to S207 for menu items stored in association with the transmitted store ID information by referring to the store-oriented menu item table.

In addition to menu items, for example, different frames for different stores may be prepared.

In a case where a single menu server 2 provides a plurality of stores with menus, the following service can be provided. When a menu item which matches with the attribute information of a customer is not available in a visited store at the time of displaying a menu, for example, information of another nearest store which provides the menu item (map information or the like showing the name and the location of the store) may be displayed on a menu. This can allow a customer to go to other chain stores.

The foregoing description of the embodiment has been given of the case where the control programs for the menu server 2 and the read/write device 3 are stored beforehand in the storage units or the like. However, the menu server 2 and the read/write device 3 may each be equipped with any one of suitable devices for reading storage mediums, such as a CD-ROM (Compact Disk Read-Only Memory), DVD (Digital Versatile Disk), MO (Magneto-Optical disk) and USB memory. The control programs may be stored in such a storage medium and be installed in the menu server 2 and the read/write device 3 to realize a device which executes the above-described processing operations.

The control programs may be stored on a disk device or the like of a predetermined server unit on the communication network, and may be downloaded to the menu server 2 and the read/write device 3. Further, the above-described processes can be accomplished by activating and executing the programs downloaded over the communication network.

The menu server 2 and the read/write device 3 according to the embodiment are not limited to have the configurations that allow the control units to perform control based on the programs, and may be realized by exclusive hardware.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-238540 filed on Sep. 13, 2007 and including specification, claims, drawings and summary. The disclosure of the above Japanese Patent Application is incorporated herein by reference in its entirety.

What is claimed is:

1. A menu distribution system comprising:

a menu server; and a read/write device connected to the menu server over a network, that writes information provided by the menu server to a paper like display having a memory property, the read/write device having:

a customer identification information reading unit that reads, from a storage medium, customer identification information specifying a customer; and a customer identification information transmitting unit that transmits the read customer identification information to the menu server, the menu server having:

a customer information storage unit that stores one or more customer attribute information for each customer;

a menu item information storage unit that stores a plurality of menu items and one or more menu item attribute information in association with each menu item;

a selecting unit that selects one or more menu items from the plurality of menu items stored in the menu item information storage unit based on the menu item attribute information associated with each menu item stored therein and the customer attribute information of the customer identified by the transmitted customer identification information;

a menu image generating unit that acquires the menu item attribute information of the selected menu items by referring to the menu item information storage unit and generates menu image data based on the acquired menu item attribute information; and a menu image transmitting unit that transmits the generated menu image data to the read/write device, the read/write device further having:

a menu image receiving unit that receives menu image data from the menu server; and a display writing unit that writes the received menu image data to the paper like display so that the menu will be displayed thereon, wherein, the selecting unit acquires a correlation value between the customer attribute information of the customer identified by the transmitted customer identification information and the menu item attribute information of each menu item stored in the menu item information storage unit, and the one or more menu items selected by the selecting unit is based on the acquired correlation value.

2. A menu server connected to a read/write device via a network, the read/write device writing information provided by the menu server to a paper like display, the menu server comprising:

a customer information storage unit that stores one or more customer attribute information for each customer;

a menu item information storage unit that stores a plurality of menu items and one or more attribute information in association with each menu item;

a selecting unit that selects one or more menu items from the plurality of menu items stored in the menu item information storage unit based on attribute information associated with the plurality of menu items stored therein and the one or more customer attribute information of the customer identified by a customer identification information transmitted from the read/write device;

a menu image generating unit that acquires attribute information associated with the selected one or more menu items by referring to the menu item information storage unit and generates menu image data based on the acquired attribute information; and a menu image transmitting unit that transmits the generated menu image data to the read/write device, wherein, the selecting unit acquires a correlation value between the one or more customer attribute information of the customer identified by the customer identification information transmitted from the read/write device and the one or more attribute information associated with each menu item stored in the menu item information storage unit, and the one or more menu items selected by the selecting unit is based on the acquired correlation value, and wherein the selecting unit compares each of the one or more customer attribute information of the customer associated with the customer identification information received from the read/write device with each comparable menu item attribute information, and acquires the correlation value by summing up points given to the one or more customer attribute information of the customer which are determined to be analogous to the comparable menu item attribute information.

3. A method of controlling a menu server connected to a read/write device via a network, the read/write device writing information provided by the menu server to a paper like display, the menu server having a customer information storage unit that stores one or more customer attribute information for each customer, a menu item information storage unit that stores one or more attribute information for each menu item, a selecting unit, a menu image generating unit, and a menu image transmitting unit, the method comprising:

a selecting step in which the selecting unit selects one or more menu items from menu items stored in the menu item information storage unit based on attribute information associated with the menu items stored therein and the one or more customer attribute information of the customer identified by a customer identification information transmitted from the read/write device;

a menu image generating step in which the menu image generating unit acquires attribute information of the selected one or more menu items by referring to the menu item information storage unit and generates menu image data based on the acquired attribute information; and a menu image transmitting step in which the menu image transmitting unit transmits the generated menu image data to the read/write device, wherein, the selecting step includes acquiring a correlation value between the one or more customer attribute information of the customer identified by the customer identification information transmitted from the read/write device and the one or more attribute information associated with each menu item stored in the menu item information storage unit, and the one or more menu items selected by the selecting unit is based on the acquired correlation value, and wherein the selecting step includes comparing each of the one or more customer attribute information of the customer associated with the customer identification information received from the read/write device with each comparable menu item attribute information, and acquires the correlation value by summing up points given to the one or more customer attribute information of the customer which are determined to be analogous to the comparable menu item attribute information.

4. A computer readable recording medium storing a program that allows a computer that is connected over a network to a read/write unit which writes information provided by the computer to a paper like display, to function as a menu server, said program allowing the computer to function as:

a customer information storage unit that stores one or more customer attribute information for each customer;

a menu item information storage unit that stores one or more attribute information for each menu item;

a selecting unit that selects one or more menu items from menu items stored in the menu item information storage unit based on attribute information associated with the menu items stored therein and the one or more customer attribute information of the customer identified by a customer identification information transmitted from the read/write device;

a menu image generating unit that acquires attribute information of the selected one or more menu item by referring to the menu item information storage unit and generates menu image data based on the acquired attribute information; and a menu image transmitting unit that transmits the generated menu image data to the read/write device, wherein, the selecting unit acquires a correlation value between the one or more customer attribute information of the customer identified by the customer identification information transmitted from the read/write device and the one or more attribute information associated with each menu item stored in the menu item information storage unit, and the one or more menu items selected by the selecting unit is based on the acquired correlation value, and wherein the selecting unit compares each of the one or more customer attribute information of the customer associated with the customer identification information received from the read/write device with each comparable menu item attribute information, and acquires the correlation value by summing up points given to the one or more customer attribute information of the customer which are determined to be analogous to the comparable menu item attribute information.

* * * * *

UNITED STATES PATENT AND TRADEMARK OFFICE

CERTIFICATE OF CORRECTION

PATENT NO. : 8,131,699 B2
APPLICATION NO. : 12/209811
DATED : March 6, 2012
INVENTOR(S) : Shinji Satoh et al.

It is certified that error appears in the above-identified patent and that said Letters Patent is hereby corrected as shown below:

On the title page, insert the following foreign priority data:

--(30) Foreign Application Priority Data

Sept. 13, 2007 (JP) ........................................ 2007-238540--

Signed and Sealed this
Third Day of April, 2012

David J. Kappos
*Director of the United States Patent and Trademark Office*